US012675757B1

(12) United States Patent
Funari et al.

(10) Patent No.: US 12,675,757 B1
(45) Date of Patent: Jul. 7, 2026

(54) SOCIAL CLIENT RELATIONSHIP MANAGEMENT AND PERSON-BASED LISTENING

(71) Applicant: United Services Automobile Association (USAA), San Antonio, TX (US)

(72) Inventors: Leonard S. Funari, San Antonio, TX (US); William Gerth, Boerne, TX (US)

(73) Assignee: United Services Automobile Association, San Antonio, TX (US)

( * ) Notice: Subject to any disclaimer, the term of this patent is extended or adjusted under 35 U.S.C. 154(b) by 16 days.

(21) Appl. No.: 18/190,766

(22) Filed: Mar. 27, 2023

Related U.S. Application Data

(63) Continuation of application No. 15/679,567, filed on Aug. 17, 2017, now Pat. No. 11,657,354.

(60) Provisional application No. 62/380,188, filed on Aug. 26, 2016.

(51) Int. Cl.
| | |
|---|---|
| *G06Q 10/0637* | (2023.01) |
| *G06F 16/9535* | (2019.01) |
| *G06Q 10/40* | (2026.01) |
| *G06Q 30/016* | (2023.01) |
| *G06Q 30/0207* | (2023.01) |

(52) U.S. Cl.
CPC ..... *G06Q 10/0637* (2013.01); *G06F 16/9535* (2019.01); *G06Q 10/40* (2026.01); *G06Q 30/016* (2013.01); *G06Q 30/0225* (2013.01)

(58) Field of Classification Search
CPC ............ G06F 16/9535; G06Q 10/0637; G06Q 30/016; G06Q 30/0225; G06Q 50/01
See application file for complete search history.

(56) References Cited

U.S. PATENT DOCUMENTS

| | | | |
|---|---|---|---|
| 9,740,940 B2 | 8/2017 | Chattopadhyay | |
| 2007/0294281 A1* | 12/2007 | Ward ..................... | G06Q 50/01 707/999.102 |
| 2011/0291953 A1* | 12/2011 | Cheok .................... | G06Q 10/06 709/204 |
| 2011/0295722 A1 | 12/2011 | Reisman | |
| 2012/0016948 A1 | 1/2012 | Sinha | |
| 2012/0130863 A1 | 5/2012 | Tedjamulia | |
| 2013/0262598 A1 | 10/2013 | Makanawala | |
| 2013/0282417 A1 | 10/2013 | Gaedcke | |
| 2014/0129942 A1 | 5/2014 | Rathod | |
| 2015/0032724 A1 | 1/2015 | Thirugnanasundaram | |
| 2015/0070506 A1 | 3/2015 | Chattopadhyay | |
| 2015/0081569 A1 | 3/2015 | Moore | |
| 2015/0201078 A1 | 7/2015 | Khouri | |
| 2015/0317356 A1 | 11/2015 | Deichler | |
| 2016/0171511 A1 | 6/2016 | Goel | |
| 2016/0217381 A1 | 7/2016 | Bloomquist | |
| 2016/0285816 A1 | 9/2016 | Schmid | |
| 2016/0307097 A1* | 10/2016 | Lu ........................... | G06F 16/00 |

FOREIGN PATENT DOCUMENTS

| | | | | |
|---|---|---|---|---|
| WO | WO-2018200295 A1 * | 11/2018 | ............. | G06Q 30/01 |

* cited by examiner

*Primary Examiner* — Brendan S O'Shea
(74) *Attorney, Agent, or Firm* — BakerHostetler

(57) ABSTRACT

Systems and methods provide social media management capable of identifying parties on social media networks and providing social media and business records related to those parties.

18 Claims, 4 Drawing Sheets

100

400

SOCIAL CLIENT RELATIONSHIP MANAGEMENT AND PERSON-BASED LISTENING

CROSS-REFERENCE TO RELATED APPLICATIONS

This application is a continuation of U.S. patent application Ser. No. 15/679,567, filed Aug. 17, 2017, which claims priority to and the benefit of U.S. Provisional Patent Application No. 62/380,188, filed Aug. 26, 2016, which is incorporated herein by reference in its entirety. This application is also related by subject matter to U.S. Provisional Patent Application No. 62/380,188, filed Mar. 31, 2015, and U.S. patent application Ser. No. 15/086,221, filed Mar. 31, 2016, both of which are incorporated herein by reference in their entirety.

TECHNICAL FIELD

The subject application generally relates to organizational communication with third parties, and more specifically relates to tracking and leveraging communications including those on social media networks.

BACKGROUND

Customer support is an essential part of every business. Customers expect thorough and timely responses to inquiries related to products or services purchased. In many instances, non-customers may communicate with organizations regarding their activities.

Social media networks make customer support and public engagement more complex. Internet-connected people have widely adopted a variety of new communication channels in the form of public and private posting or messaging in different social media networks. Public individuals and organizations now maintain social media accounts to exercise some element of control over messaging and publicity related to their activities in social media channels. Social media also provides opportunities for marketing and customer engagement.

However, with the presence of social media accounts, users will feel inclined to contact or reference the individuals or organizations. While it is possible to respond to users through interfaces provided by the social media networks, entities cannot always determine the identity of the party with whom they are communicating, and whether customer details or interaction histories are relevant to responding in an appropriate manner.

Accordingly, it would be beneficial to utilize systems and methods for identifying users or communications of interest in social media as well as storing and analyzing their social media activity.

SUMMARY

In an embodiment, a system comprises a collection subsystem configured to collect social post data from one or more social media networks. The social post data is collected based on one or more keyphrases. The system also comprises a stitching database configured to store social identities based on the social post data. The system also comprises a customer service interface configured to provide the social post data and the social identities to a member services representative and a response module configured to provide a response to one or more social media posts related to the social post data.

In an embodiment, a method comprises detecting a keyphrase in a social media post on a social media platform and determining whether the social media post relates to a customer service issue. If the social media post relates to a customer service issue, the method further comprises identifying a member related to the social media post. If the social media post relates to a customer service issue, the method further comprises creating a service ticket and routing the service ticket to a service handler. The method further comprises determining whether to answer to the social media post publicly. If the social media post will be answered publicly, the method further comprises determining whether the social media post will be answered manually or automatically. If the social media post is to be answered manually, the method further comprises creating an answer ticket and routing the answer ticket to an answer handler. If the social media post is to be answered automatically, the method further comprises generating an answer post based on the social media post.

In an embodiment, a method comprises detecting a keyphrase in a social media post on a social media platform, determining whether a party related to the social media post is a client, and determining whether the social media post relates to a customer service issue. If the social media post relates to a customer service issue, the method further comprises creating a service ticket and routing the service ticket to a service handler, wherein the service ticket is associated with the client. The method also comprises determining whether to answer to the social media post publicly. If the social media post will be answered publicly, the method further comprises determining whether the social media post will be answered manually or automatically. If the social media post is to be answered manually, the method further comprises creating an answer ticket and routing the answer ticket to an answer handler. If the social media post is to be answered automatically, the method further comprises generating an answer post based on the social media post.

Additional and alternative aspects will be apparent on review of other portions of this disclosure.

BRIEF DESCRIPTION OF THE DRAWINGS

So that those having ordinary skill in the art, to which the present disclosure pertains, will more readily understand how to employ the novel system and methods of the present disclosure, certain illustrated embodiments thereof will be described in detail herein-below with reference to the drawings, wherein.

DETAILED DESCRIPTION

Systems and methods for integrating social media data into customer service and marketing are disclosed. Clients and other parties may be identified by social media handles and records of both social media and business activities can be provided during interaction. Additional information can be provided or developed based on social media activity.

As used herein, a "social media network" can be any website, service, or product, whether free or paid, that allows users to register accounts or handles and contribute content. These can include, but are not limited to, Facebook, Google+, Instagram, Twitter, Tumblr, Snapchat, Weibo, Myspace, Nextdoor, and others. Professional networks such as LinkedIn, Vault, or GlassDoor are considered "social media networks" for purposes of this disclosure, as are other interactive sites accepting user content such as YouTube, Reddit, Vine, et cetera. Specialty social networks with subject matter focuses, such as UnTappd or Cor.kz for libations, can also be used for data collection even if no social media account is maintained on the network.

Social media data can include data available on one or more social media networks, including public or private posts or other communications (including multimedia content), account details, relationships or interactions, et cetera. Public or private posts or other communications can include, e.g., posts, pictures or photo albums, statuses, Tweets, Snaps, blog entries, videos, audio, private messages, direct messages, instant messages, group messages, et cetera.

"Member Service Representatives" (MSRs) are parties working on behalf of an entity to external third parties. MSRs represent the entity providing sales, customer support, and other information.

As used herein, "clients" can be any party with which an entity has a business relationship, and can include customers, members, et cetera. Business data can include information about transactions or interactions with third parties, such as records of purchases or sales, account information, scheduling, et cetera.

As used herein, a "keyphrase" is a word, phrase, or other content portion of interest to an entity performing social media management. Examples of keyphrases can include, but are not limited to, business names, trademarks, servicemarks, industry terms, nicknames, names of entity leaders or employees, individual or business client names, and others. Content can include original or derivative images, audio, or video related to the entity's interests.

Figure 1:
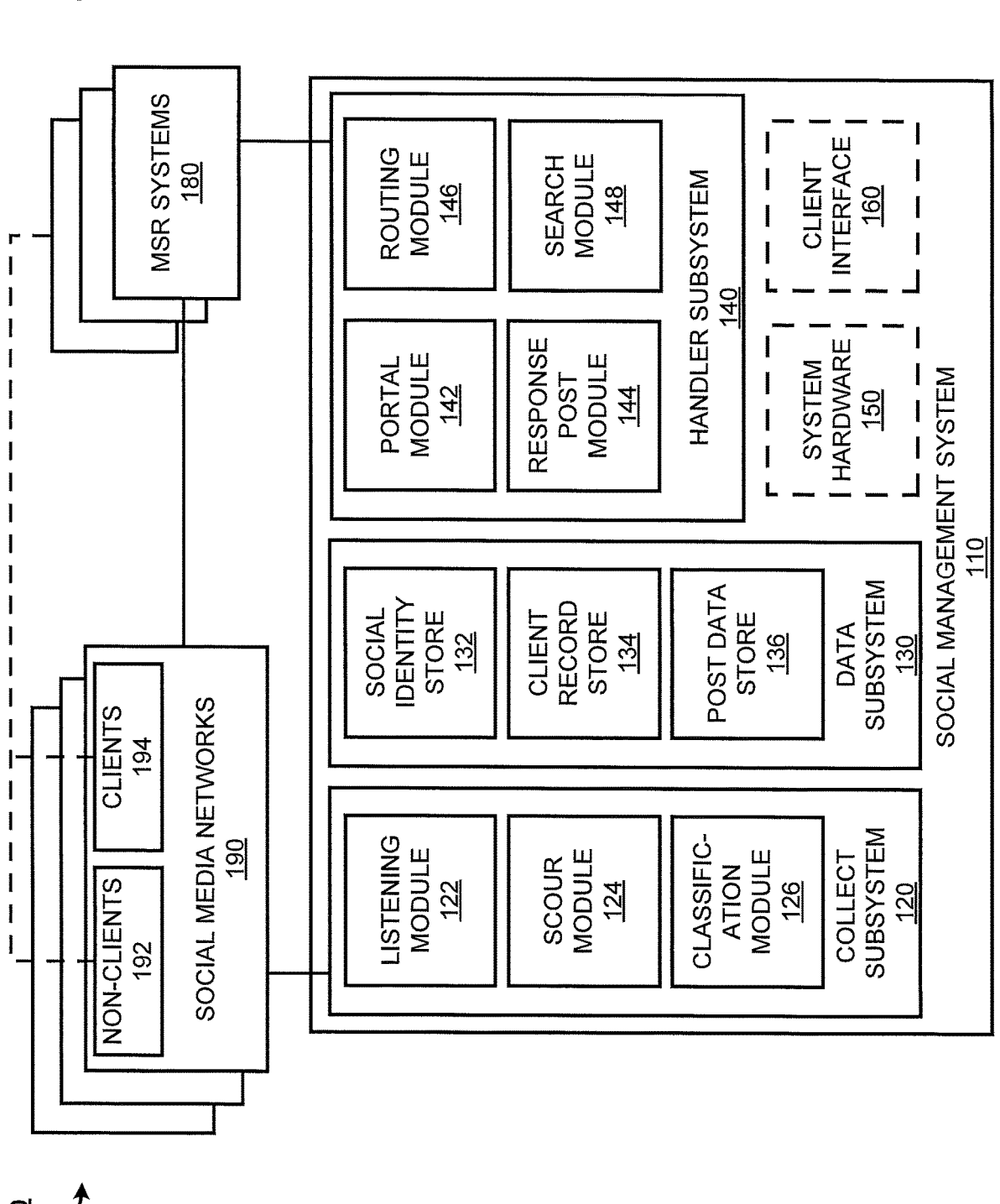
FIG. 1 illustrates a block diagram of an example system of the disclosure.

FIG. 1 illustrates an example block diagram of a system 100 disclosed herein. System 100 links social media networks 190, MSR systems 180, and social management system 110. Social media networks 190 include accounts and/or systems for non-clients 192 and clients 194. In embodiments, various elements of system 100 may communicate directly with one another, or elements may interact with one another through intermediary elements.

Collection subsystem 120 can interact with social media networks 190 to collect social media data. In embodiments, social post data is collected based on one or more keyphrases. Collection can occur using listening module 122, scour module 124, and/or classification module 126.

Listening module 122 is configured to observe, capture, harvest, and/or monitor accessible social media streams or feeds, which can be public (e.g., open accounts), semiprivate (accounts which must be followed, liked, or connected to view), or private (accounts requiring express approval to view, individual or group private posts), and scans content, metadata, and other associated information for keyphrases. In embodiments, keyphrase-based searching can be performed periodically or continuously. Keyphrases can be modified for monitoring when used as social media account names or "handles," hashtags, or other variants, in addition to monitoring of written text which may include the string of characters.

In embodiments, listening module 122 is also configured to analyze content, metadata, and other associated information for non-textual key content, such as still or video images, sounds, et cetera, using media comparison tools, machine vision, and/or audio analysis. In this fashion, logos, advertisements, jingles, and other works related to trademark, copyright, publicity, or other rights can be identified in social media. Searching tools can also be utilized (e.g., reversed image searching, audio recognition utilities) to actively seek such content in social media networks.

Scour module 124 is configured to crawl or scour information on the social media networks. Scour module can search additional information not necessarily related to posts or feeds, such as profiles, accounts, pages, et cetera. Scour module 124 may utilize keyphrases, or may scour information unrelated to keyphrases. In embodiments, scour module 124 can be configured to search for names, e-mails, or other identifying information to locate social media accounts or handles of clients or members. In this regard, scour module 124 can locate one or more social media accounts associated with clients and classify these accounts as "unconfirmed" social media identities until the client confirms or denies connection to the account.

In embodiments, social media network data which need not be (but may be) related to keyphrase data can be used to develop a more complete profile and understanding of clients, prospects, or other parties. Social media information scoured can reveal demographic information, information regarding family and friends, professional responsibilities, hobbies and interests, civic involvement, political leanings, travel, spending habits, opinions, et cetera. This data can be used to route social media interactions with a party to MSRs sharing their interests and opinions, and/or to provide information relevant to interests or opinions for developing or deepening relationships with existing or prospective clients.

Classification module 126 is configured to classify, tag, categorize, or analyze social post data and/or other data from social media networks 190. Classification module 126 can associate posts or other data with particular parties; identify the tone or attitude of a post; identify the presence of particular language in a post (e.g., profanity); et cetera. One or more categories or tags can be applied to a post to assist in its storage, routing, and/or handling (if any) of subsequent actions or responses. Classification module 126 can also define a priority or handling time to identify and/or enforce quality of service requirements or constraints.

Collection can identify the use of keyphrases, identify activity related to clients or prospects, identify activity related to employees or vendors, identify activity related to competitors, identify activity related to an industry, et cetera. Customer satisfaction, recruiting, marketing, competitive analysis, employee sentiment, brand sentiment, et cetera, can be assessed using data collected. In embodiments, the social media success or failure of competitors or third parties can be assessed by analyzing data collected.

Collection can also identify life events or other information relating to products or services purchased by or offered to clients based on the client's social media activity. For example, marriages, divorces, births, deaths, major purchases, losses (e.g., theft, weather damage), job changes, illnesses, birthdays, and other events can be ascertained through collection of client social media data. Discovery of these events can facilitate automated employment of goods or services related to the events which are already purchased (e.g., start insurance claim or prompt to initiate retirement payments) or business development actions related to goods or services not yet purchased (e.g., offer to open savings account).

Data subsystem 130 includes social identity store 132, client record store 134, and post data store 136. Data subsystem 130 can be referred to as a "stitching database" because it combines (or "stitches" social identities to business client accounts, thereby merging multiple data sources.

Social identity store 132 is configured to store social identities and information related to the social media presence of one or more parties. The parties can be non-clients, unconfirmed clients (e.g., inference or evidence of link between client records and one or more social media accounts without confirmation from client), or confirmed clients (e.g., client actively provides social media account information; client confirms previously-unconfirmed social media account information). Social identity store 132 can store social credentials, which can include account names or handles, information for accounts with access to view some or all content from particular social media sources, and/or login or administrative information related to the social identities.

In embodiments, social identity store 132 can include a member profile from a social media network. The member profile may be as-provided on the social media network, or may be loaded or modified into social management system 110 with truncation or additional information. Multiple views may be provided, including summary pages of different social handles or profiles.

Client record store 134 is configured to store client records related to a business or organization. In embodiments, records can include more than clients. For example, records relating to employees, recruiting prospects, vendors, competitors, et cetera, can be stored. Client record store 134 can include cross-references to one or more social identities in social identity store 132 to link social identities with client records. In this manner, customer service, marketing, and other business activities can be conducted using social media networks 190 in the same manner as other channels, facilitating MSR access to account information and interaction history. In embodiments, client record store 134, or a separate business data store, can be used to store business data.

Post data store 136 is configured to store or archive post data and other social media data. Storage can include saving source code and/or media, preserving screen shots of posts or media, and other techniques. Post data store 136 can be provided to ensure a comprehensive record of interactions with parties and use of keyphrases over or in social media networks 190. In embodiments, other data can also be stored (e.g., information related to clients unrelated to keyphrases or posts).

Different access rules and restrictions can be applied to social identity store 132, client record store 134, and/or post data store 136. In this fashion, confidential data such as bank records can be shielded from business units or personnel without a need for such information, but open information such as public posts or profiles can be accessed by all MSRs or parties with portal access.

Handler subsystem 140 is configured to handle posts and other interactions. Portal module 142 provides one or more hubs or interfaces for MSRs and/or MSR software to facilitate access to social media networks 190 and data subsystem 130, thereby integrating social media monitoring, communication, and management into MSR systems. In embodiments, portal module 142 provides standalone software. In embodiments, portal module 142 provides a browser-accessible webpage. In embodiments, portal module 142 provides interfaces or add-ons for existing software packages used by MSRs to communicate with clients or prospects and manage accounts. Portal module 142 can thus provide or augment a customer service interface allowing MSRs to utilize social post data and social identities. In embodiments, handler subsystem includes interfaces, tickets, timers, and re-routing or reminder capabilities to enforce quality of service requirements or constraints.

Portal module 142 can provide a portal view of a social media post, a link to a social media post, or a redirect to a social media post. Portal module 142 may also assist collection subsystem 120 in caching or storing social media posts, including metadata such as Uniform Resource Locator (URL) parameters.

Response post module 144 and/or other modules determine whether a response is warranted. For example, if a post tagging or mentioning a business is clearly spam, no response may be warranted. Alternatively, while no public response may be warranted, the tag or mention may be removed if possible. Alternatively, a social media post using a business-specific keyphrase may provide an opportunity to present product information or engage entertainingly with clients or prospects, thereby justifying a response. In still another example, a prospect or unconfirmed client, or a confirmed client, may ask questions requiring customer service. A determination can be made as to whether to respond using the social media network over which the service issue arose, and whether the response should be public or private.

If it is determined that a response is warranted, further determinations can be made as to whether the response should be manually created (e.g., by a MSR or other party) or automatically generated, and whether the response should be public (e.g., posted in public reply or comment, or separate post) or private (e.g., direct message or private message, contact through another channel such as e-mail or telephone). Whether automatic or manual, the determination may include identification of who (e.g., which MSR, which account if automated) responds to who (e.g., original poster, party who tagged), what the response contains, where they respond, when they respond, and how they respond.

Response post module 144 can generate automatic responses to social media posts based on rules if it is determined that a response is warranted but that the response should be automated. Response post module 144 can alternatively generate an answer ticket providing a request that a live person handle a manual response to one or more social media posts where a response is warranted.

Response post module 144 can be configured to provide answering or responsive social media posts publicly or privately. In embodiments, response post module 144 posts the social media response or answer to one or more pages or feeds.

In an embodiment, response post module 144 (or another module) can provide a script to a MSR for handling an issue or communication. The script can be standardized, provided as a modification from a standardized script, or generated anew based on information related to the communication (e.g., social media post or message).

Routing module 146 is configured to route posts, content, or other tickets to MSRs or other parties. In an embodiment, routing module 146 can route a customer service related post or ticket to an MSR capable of handling the issue. In embodiments, the MSRs can be prioritized based on interests or opinions similar to the customer, previous experience with the customer, and other aspects.

In an embodiment, routing module 146 routes discussion to a MSR capable of selling or upselling a social media poster, or otherwise developing a relationship based on the poster's use of a keyphrase. In an embodiment, routing module 146 routes a post or answer ticket to a MSR for a public response even though the original post did not raise a customer service issue.

In embodiments, one or more modules (e.g., portal module 142, response post module 144, and/or routing module 146) can facilitate scheduling of follow-up on the same or different communication channels. In this fashion, service levels can be maintained and enforced, and clients (and/or non-client social media participants) can communicate during their preferred times.

Search module 148 is configured to search data from data subsystem 130 and/or social media networks 190 for search strings including but not limited to keyphrases and identities. In an embodiment, search module 148 is available via portal module 142 or other interfaces. Search module 148 can assist with client relationship management, trend research, et cetera.

In embodiments, handler subsystem 140 can resolve issues without generating a service ticket, or resolve at least some outstanding service tickets itself. In embodiments, some issues may be addressed automatically using rule-based approaches or machine learning. In embodiments, user input can be used to resolve customer service issues. Guided user input or interpretation of user text or speech can be used to manage accounts (e.g., fund transfers, purchase or discontinue services, change passwords, check balances, renew policies, et cetera). Where user input is solicited or interpreted, such can be received in public or private interactions on social media networks 190 and archived in data subsystem 130.

In embodiments, handler subsystem 140 is configured to provide an organized database of social conversations to MSRs or other parties. The database can be sorted by user, by date, by topic, by social media network, et cetera. Using user sorting (or search module 148), MSRs or other parties can quickly refer to all communication from a particular client (or other parties) across all channels.

Social management system 110 can also include system hardware 150, which can include one or more sensors, such as cameras, microphones, location components, and others. The sensors can collect data related to social media posts or accounts. In embodiments, system hardware 150 can be additional hardware or resources for running social management system 110. Systems 300 and 400 illustrate possible embodiments of hardware and network aspects.

In embodiments, social management system 110 also includes client interface 160. Client interface 160 can be configured to receive inputs from clients using public or private communication techniques in social media networks 190 and/or a client portal or interface. In embodiments, client interface 160 can allow users to enter social media identities or social media credentials to establish confirmed social media accounts. In embodiments, client interface 160 provides controls to allow a user to confirm previously unconfirmed social media identities or credentials. Client interface 160 can allow "opt-in" for verified data, which may be of greater relevance than harvested data. Other input from clients or other parties can also be received.

In embodiments, multiple variants of single modules shown in system 100 can exist to facilitate interaction with different networks among social media networks 190. Particular modules can be developed to facilitate interaction with the particular content and interfaces of any one (or more) of social media networks 190.

Figure 2:
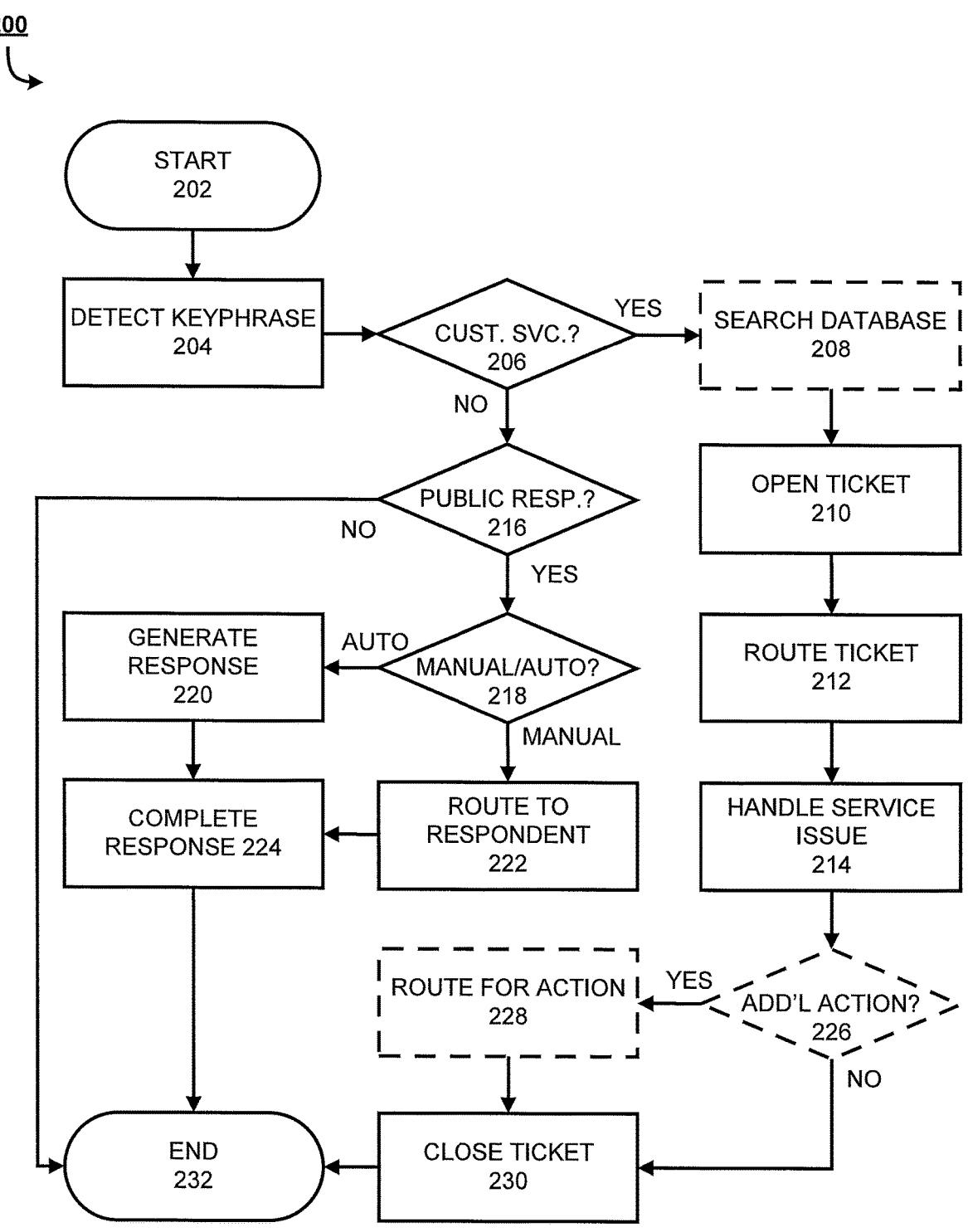
FIG. 2 illustrates a flow chart of an example method of the disclosure.

Turning to FIG. 2, illustrated is a methodology 200 in accordance with the disclosures herein.

Methodology 200 begins at 202 and proceeds to 404 where a keyphrase is detected. In alternative embodiments, other data can be detected or located, including specific multimedia or media derived therefrom. At 206, a determination is made as to whether the keyphrase is used in conjunction with a customer service request or issue.

If the determination at 206 returns negative, methodology 200 proceeds to 216 where a determination is made as to whether a public response should be provided. The determination as to whether a public response is required can be based on the context of keyphrase use, which can be assessed based on language recognition or machine learning, phrase matching, and other techniques. In embodiments, a point system is used such that a post is referred to a reviewer if a point threshold is exceeded, with points scored according to post emotion (positive or negative), newsworthiness, relationship opportunity (to sell, deepen, or otherwise develop), entertainment opportunity, et cetera. If no public response is to be made, methodology 200 can proceed to 232 and end.

If a public response is to be made, methodology 200 proceeds to 218 where a determination is made as to whether the public response will be automatically generated or manually developed by a MSR or other party. If the public response is to be automatically generated, methodology 200 proceeds to 220 where an automatic response is provided or generated from a library, using rules, or using artificial intelligence. If the public response it be manually generated, methodology 200 proceeds to 222 where the post is routed to one or more respondents for handling. In embodiments, an answer ticket can be generated and closed based on this routing. After 220 or 222, methodology 200 proceeds to 224 where the response is completed, and methodology 200 ends at 232.

If the determination at 206 returns positive, methodology 200 advances to 208 where, in some embodiments, a database can be searched to determine a client associated with the social identity raising the customer service issue. In embodiments, a search can precede determination as to whether a post relates to a customer service issue. Thereafter, or based thereon, a service ticket related to the customer service issue can be opened at 210 and routed to a MSR or other party at 212.

At 214, the service issue associated with the ticket can be handled or managed by a MSR. In alternative or complementary embodiments, the service issue can be automatically handled using machine learning, rule-based management, text or speech recognition, information prompted from a client, et cetera. At 226, a determination may be made as to whether additional action is required before closing the ticket. This can include transferring the issue or ticket to a different platform or communication channel. If the determination at 226 returns positive, the updated ticket can be routed to the same or different parties at 228 for action. If the determination at 226 returns negative, or after 228, methodology 200 proceeds to 230 where the service ticket is closed. Thereafter, at 232, methodology 200 ends.

As will be appreciated on study of the disclosures herein, methodologies similar to methodology 200 can be implemented in alternative manners without departing from the scope or spirit of the innovation. For example, public response and customer service issues need not be mutually exclusive, and so methodology 200 may split at 210, proceeding to both 212 and 216, in accordance with aspects herein. Further, before determining a ticket should be opened, various filters or screens can be assessed to prevent opening tickets for situations which do not require MSR attention.

Various other methods can be employed in accordance with the disclosures herein as well. In an example, a method comprises detecting a keyphrase in a social media post on a social media platform and determining whether the social media post relates to a customer service issue. If the social media post relates to a customer service issue, the method further comprises identifying a member related to the social media post. If the social media post relates to a customer service issue, the method further comprises creating a service ticket and routing the service ticket to a service handler. The method further comprises determining whether to answer to the social media post publicly. If the social media post will be answered publicly, the method further comprises determining whether the social media post will be answered manually or automatically. If the social media post is to be answered manually, the method further comprises creating an answer ticket and routing the answer ticket to an answer handler. If the social media post is to be answered automatically, the method further comprises generating an answer post based on the social media post.

Further embodiments of the method can include storing social media credentials of the member in a social media data subsystem. Further embodiments of the method can provide that the social media data subsystem includes client records. Further embodiments of the method can provide that accounts from the social media platform are identified in the social media data subsystem as non-client, unconfirmed client, or confirmed client.

Further embodiments of the method can include providing a social media portal to the service handler based on the social media post and the service ticket. Further embodiments of the method can include classifying the social media post into one or more categories.

In alternative embodiments, client relationships or other information can be assessed prior to opening a ticket or taking action. For example, a method can comprise detecting a keyphrase in a social media post on a social media platform, determining whether a party related to the social media post is a client, and determining whether the social media post relates to a customer service issue. If the social media post relates to a customer service issue, the method further comprises creating a service ticket and routing the service ticket to a service handler, wherein the service ticket is associated with the client. The method also comprises determining whether to answer to the social media post publicly. If the social media post will be answered publicly, the method further comprises determining whether the social media post will be answered manually or automatically. If the social media post is to be answered manually, the method further comprises creating an answer ticket and routing the answer ticket to an answer handler. If the social media post is to be answered automatically, the method further comprises generating an answer post based on the social media post.

Figure 3:
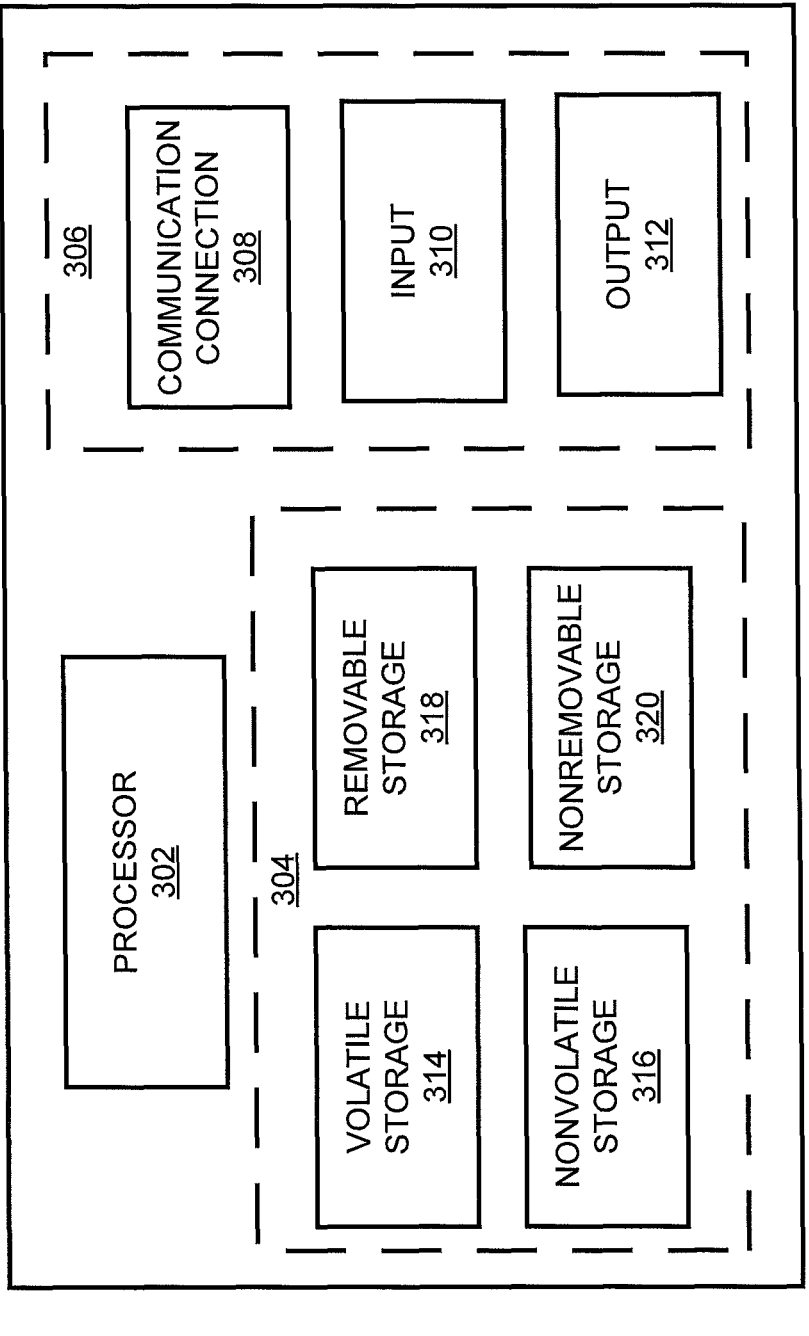
FIG. 3 is a block diagram illustrating an example implementation of a device which can be utilized in conjunction with or comprise a portion of systems disclosed.

FIG. 3 illustrates a device 300. Device 300 may comprise all or a part of modules or components herein. Device 300 may comprise hardware or a combination of hardware and software. The functionality to facilitate telecommunications via a telecommunications network may reside in one or combinations of links, portals, or connections. Device 300 depicted in FIG. 3 may represent or perform functionality of an appropriate device 300, or combination of modules or components herein. It is emphasized that the block diagram depicted in FIG. 3 is example and not intended to imply a limitation to a specific implementation or configuration. Thus, device 300 may be implemented in a single device or multiple devices. Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with aspects disclosed herein. As evident from the description herein, device 300 is not to be construed as software per se.

In addition to processor 302 and memory 304, device 300 may include an input/output system 306. Processor 302, memory 304, and input/output system 306 may be coupled together (coupling not shown in FIG. 3) to allow communications there between. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or providing information from or to a communications device or other network entities configured for telecommunications. For example input/output system 306 may include a wireless communications (e.g., WiFi/2.5G/3G/4G/GPS) card. Input/output system 306 may be capable of receiving or sending video information, audio information, control information, image information, data, or any combination thereof. Input/output system 306 may be capable of transferring information with device 300. In various configurations, input/output system 306 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 306 may comprise a WiFi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with aspects described herein. For example, processor 302 may be capable of, in conjunction with any other portion of device 300, managing social media communications as described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations for, e.g., listening to social media activity.

Figure 4:
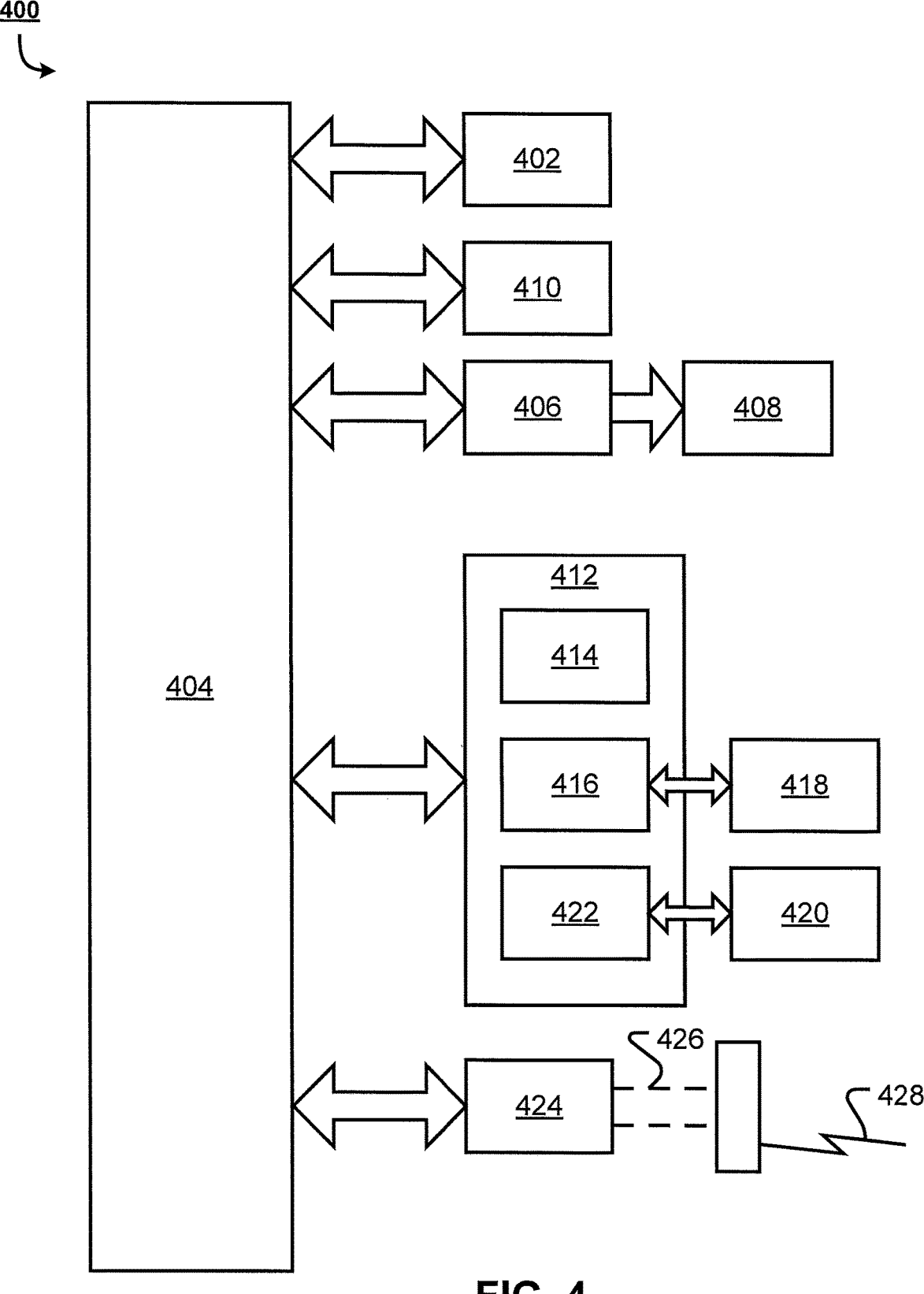
FIG. 4 is a block diagram of a computer system that be used to implement at least a portion of aspects herein.

FIG. 4 illustrates a computer-based system 400 that may constitute or include parts of one or more of aspects of, e.g., FIGS. 1 and/or 2, or device 300. Computer-based system 400 includes at least one processor, such as a processor 402. Processor 402 may be connected to a communication infrastructure 404, for example, a communications bus, a cross-over bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer (not shown) for display on a display unit 408.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, etc. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 416, a hard disk installed in hard disk drive 414, or the like. These computer program products provide software to computer-based system 400. The present disclosure is directed to such computer program products.

Computer programs (also referred to as computer control logic) may be stored in main memory 410 or secondary memory 412. The computer programs may also be received via communication interface 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using a software, the software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications in systems and networks discussed herein.

Methodologies herein are described with specific aspects for ease of explanation with respect to various embodiments. However, methodologies embraced under the scope and spirit of the disclosure may vary, to include excluding particular aspects or comparisons described.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A non-transitory computer readable medium storing code instructions that are configured to perform, when executed by a processor, a method, comprising:

retrieving content of social media posts associated with a client account on two or more social media platforms;

merging the content from the two or more social media platforms in a stitching database;

classifying, based on an unconfirmed link between client records and the client account, the client account as a located account, wherein the located account is associated with the client account that has not been confirmed by a user;

classifying, based on receiving a confirmation of the located account is a client account from the user, the client account as confirmed;

detecting use of a keyphrase in the content of the stitching database, wherein the keyphrase includes at least one pre-identified word or one or more variants of the at least one pre-identified word in non-textual audio content or video content, and wherein the detecting is performed using one or more of a media comparison tool, machine vision, or audio analysis of the non-textual audio content or video content;

determining that at least one of the plurality of the social media posts relates to a customer service issue associated with a business;

determining, using machine learning, to post a response to the at least one of the social media posts;

generating a context-based response to the one or more social media posts using artificial intelligence by way of rules and a library; and answering the at least one of the social media posts by posting the context-based response to at least one of the two or more social media platforms using an account associated with the business.

2. The non-transitory computer readable medium of claim 1, the method further comprising storing social media credentials of a member related to the social media posts in a social media data subsystem.

3. The non-transitory computer readable medium of claim 2, wherein accounts from the social media platform are identified in the social media data subsystem as non-client, unconfirmed client, or confirmed client.

4. A system, comprising a non-transitory computer readable medium storing code instructions that are configured, when executed by a processor, to effectuate:

a collection subsystem configured to collect social post data from two or more social media networks, wherein the social post data includes non-textual audio or video content, and wherein the collection subsystem merges content from the two or more social media networks in a stitching database;

a listening module of the collection subsystem configured to detect use of a keyphrase in the non-textual audio or video content of a plurality of social media posts, wherein detecting the keyphrase in the non-textual audio or video content is performed using one or more of a media comparison tool, machine vision, or audio analysis of the non-textual audio or video content;

wherein a client account is classified, based on an unconfirmed link between client records and the client account, as a located account, wherein the located account is associated with the client account but has not been confirmed by a user, until a confirmation of the account is received from the user;

a classification module of the collection subsystem configured to classify the one or more posts associated with the social post data into one or more post categories, wherein the one or more categories categorize attitudes of users creating social post data;

a response post module configured to generate context-based automatic response to at least one post associated with a business using a machine learning model, wherein the response post module further answers at least one of the social media posts by posting the context-based response to at least one of the two or more social media networks using an account associated with the business; and a customer service interface configured to determine similarities between member services representatives and at least one of the users, wherein the customer service interface is further configured to route the social post data to one of the member services representatives based on the attitudes and the similarities between the one of the member services representatives and the at least one of the users.

5. The system of claim 4, wherein the customer service interface is further configured to route social identities to the one of the member services representatives based on the attitudes and the similarities between the one of the member services representatives and the at least one of the users.

6. The system of claim 5, wherein the social identities are based on business data and the business data is associated with one or more clients.

7. The system of claim 6, wherein the code instructions arc configured, when executed by a processor, to effectuate:

a search module of the customer service interface configured to search for portions of the social post data associated with at least one of the one or more clients.

8. The system of claim 5, wherein the social identities are classified as non-client, unconfirmed client, or confirmed client.

9. The system of claim 8, wherein the social identities include client social credentials.

10. The system of claim 4, wherein the code instructions are configured, when executed by a processor, to effectuate:

a response decision module that determines whether to respond to the one or more social media posts.

11. The system of claim 4, further configured to generate a customer service ticket for the member services representative based on the social post data.

12. The system of claim 4, wherein the social media posts comprise textual data.

13. A non-transitory computer readable medium storing code instructions that are configured to perform, when executed by a processor, a method, comprising:

accessing content of social media posts associated with a client account on two or more social media platforms;

merging the content from the two or more social media platforms in a stitching database;

classifying, an account associated with the processor from a social media platform wherein the account is identified as non-client, located account, or confirmed client account;

classifying, based on an unconfirmed link between client records and the client account, the client account as a located account, wherein the located account is associated with the client account that has not been confirmed by a user;

classifying, based on receiving a confirmation of the located account is a client account from the user, the client account as confirmed;

detecting use of a keyphrase in the content of the stitching database, wherein the keyphrase includes at least one pre-identified word or one or more variants of the at least one pre-identified word in non-textual audio content or video content, and wherein the detecting is performed using one or more of a media comparison tool, machine vision, or audio analysis of the non-textual audio content or video content;

classifying the social media posts based on attitudes of a client;

determining that at least one of the social media posts relate to a customer service issue associated with a business;

creating an answer ticket and routing the answer ticket to an answer handler, wherein a priority of the answer ticket is based on the attitude, and wherein routing is based on a similarity between the answer handler and the client;

generating a context-based response to the one or more social media posts using artificial intelligence by way of rules and a library; and causing answering of the at least one social media post based on the answer ticket and the context-based response.

14. The non-transitory computer readable medium of claim 13, wherein the content includes textual content.

15. The non-transitory computer readable medium of claim 13, wherein the answering includes removing a tag in the at least one of the social media posts.

16. The non-transitory computer readable medium of claim 13, wherein the answering includes a customer service interface configured to provide at least a portion of the content and identities associated with at least the portion of the content to a member services representative based on the attitudes and the similarities between the one of the member services representatives and the at least one of the users.

17. The non-transitory computer readable medium of claim 13, further comprising:

providing a social media portal which comprises one or more hubs or interfaces for a member services representatives or member services representative software to facilitate access to social media networks and data subsystem, wherein the social media portal integrates social media monitoring, communication, and management into member services representative systems.

18. The non-transitory computer readable medium of claim 13, further comprising:

a post data store configured to store or archive post content, post metadata and platform data including saving source code or media and preserving screen shots of posts or media to ensure a comprehensive record of interactions.

\*   \*   \*   \*   \*